J. W. GAMBLE.
TRACTOR BINDER HITCH.
APPLICATION FILED MAY 31, 1919.
Reissued Nov. 8, 1921. 15,219.
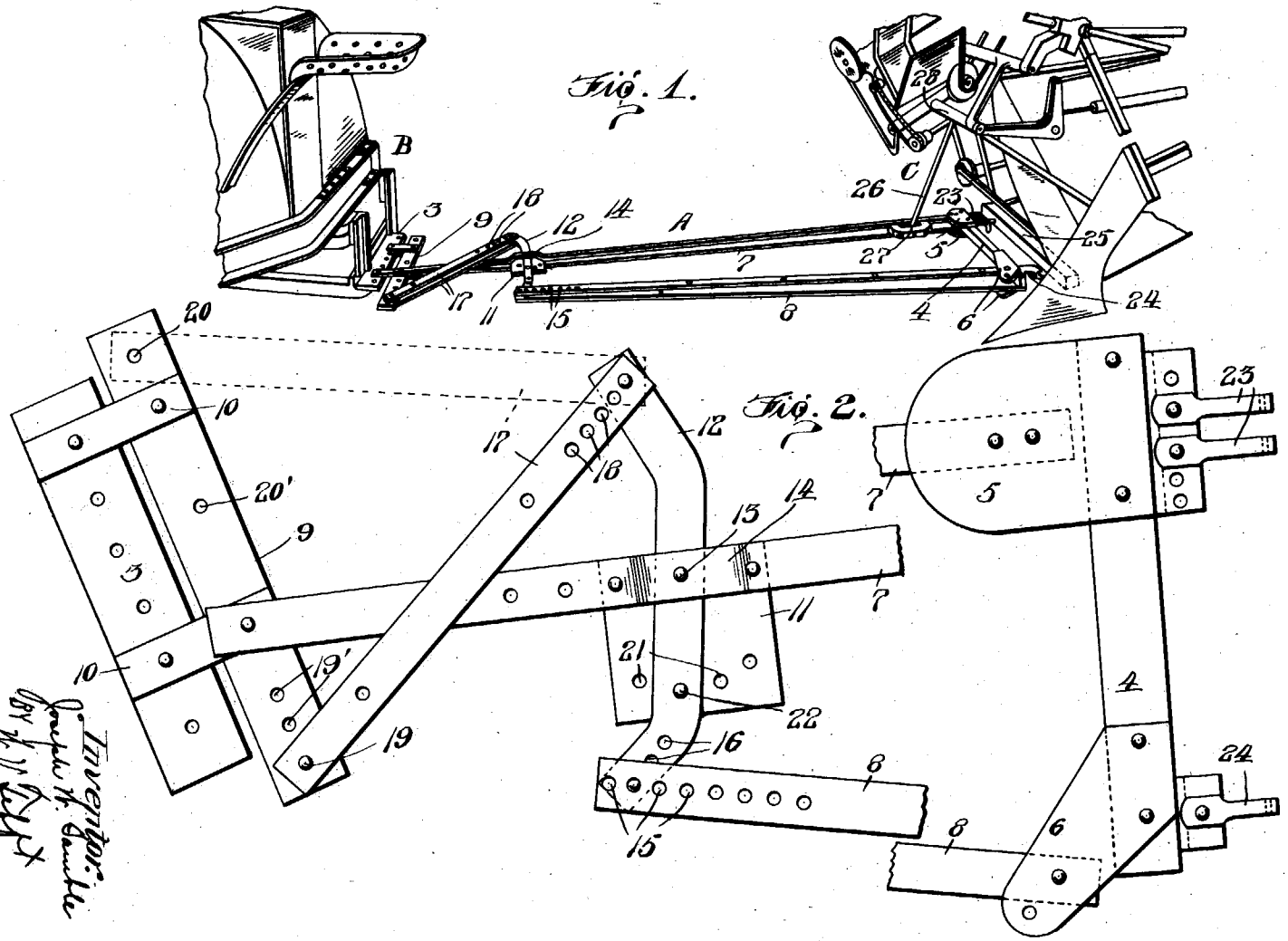
Inventor:
Joseph W. Gamble
By W. V. Leffler

UNITED STATES PATENT OFFICE.

JOSEPH W. GAMBLE, OF BOONE, IOWA.

TRACTOR-BINDER HITCH.

15,219. Specification of Reissued Letters Patent. Reissued Nov. 8, 1921.

Original No. 1,225,428, dated May 8, 1917, Serial No. 113,467, filed August 7, 1916. Application for reissue filed May 31, 1919. Serial No. 301,100.

*To all whom it may concern:*

Be it known that I, JOSEPH W. GAMBLE, a citizen of the United States, residing at Boone, in the county of Boone and State of Iowa, have invented new and useful Improvements in Tractor-Binder Hitches, of which the following is a full, clear, concise, and exact description, reference being had to the accompanying drawing, forming a part of this specification.

My invention relates to improvements in tractor binder hitches, and has for its object the production of a device, the use of which will permit the turning of square corners and insure a uniform cut.

A further object is the production of a device by means of which the width of the swath cut may be regulated.

A further object is the production of a device in which the outer end of the binder may be kept from swinging forward or back as desired.

A further object is the production of a device of cheap and simple construction, easily adjustable to fulfil various uses to which it may be put and not liable to disarrangement of parts.

These and such other objects as may hereinafter appear are obtained by my device, an embodiment of which is illustrated in the accompanying drawings in which—

Figure 1 represents a perspective view of my device attached to the rear of a tractor and front of a binding machine; and Fig. 2 represents an enlarged top plan view of my device.

Like numerals of reference indicate like parts in the several figures of the drawings.

Referring now to the drawing, in Fig. 1 is shown my improved binder hitch A in operative position between the tractor B and a binder C, the device being rigidly secured to the tractor beam bar 3. The device proper comprises a cross bar 4 on either side of which are mounted retaining plates 5 and 6, the bar being secured between the plates. A draft bar 7 is secured at its rear end between the plates 5, and a grain bar 8 is secured at its rear end between the plates 6. The forward end of the draft bar is pivotally secured to an extension bar 9 and the extension bar is rigidly secured to the tractor bar 3 by means of bars 10—10. A supporting plate 11 is rigidly mounted on the draft bar and extending toward the grain side opposite the end of the grain bar 8. A movement translator-bar 12 is pivotally mounted on the draft bar at 13, a bar 14 being secured at the top and bottom of the plate and raised from the surface permitting the movement of the movement translating bar over the surface of the plate, the bar serving to retain the movement translating bar in operative position without any undue strain on the pivot.

The movement translating bar is connected at its grain end to the end of the grain bar 8, the end of the grain bar being provided with a plurality of bolt holes 15, and the end of the movement translating bar having corresponding bolt holes 16 permitting a variety of adjustments between the ends of the two members. The stubble side of the movement translating-bar is pivotally connected to a cross bar 17, the cross bar being provided with a plurality of bolt holes 18 permitting a similar adjustment between the two members. The upper end of the cross bar 17 is pivotally connected at 19 to the grain end of the extension bar 9, this bar also having a plurality of bolt holes 19′ on the grain side, and additional bolt holes 20—20′ on the stubble side, as will be explained later.

The plate 11 is provided with a plurality of bolt holes 21 positioned in the arc of the circle, the center of which is the pivotal point 13, and a bolt hole 22 is positioned in the movement translating bar and adapted to register with the bolt holes 21 making it possible, by the insertion of a bolt through 21, to rigidly secure and lock the movement translating bar in any desired position and rigid with the draft bar. The connection between the device and the binder may be effected by pairs of clevises 23—24 swingingly secured to the rear bar 25 of the binder. A tilting bar 26 is also provided pivotally mounted on the draft bar as at 27 and on the binder at 28. It will be noted that by reason of the various bolt holes provided in the various members and plates a uniform variety of adjustments of the various parts of the device may be effected.

Referring now to the operation of my device in the form illustrated I show the device in its normal position with the cross bar attached to the grain end of the extension. In this position when the tractor turns the corner left the outer end of the binder is brought forward and when started is turned away and the end is thrown back in line. The cross bar at the front end of grain bar is provided with holes as shown to adjust the cut of the binder by moving the lever at the front end of the grain bar forward or back. The binder hitch mechanism shown and above described may be readily converted into a rigid draft member that will prevent any relative swinging movement between the binder and the draft vehicle by removing the bolt 19, which locks the forward end of the cross strap from the attachment bar 9, and swinging the bar to a position so that the cross bar may be united with the opposite end of said attachment bar by means of a pin as 20. This makes a rigid hitch.

I have shown in full lines, in Figs. 1 and 2, the normal position. In order to arrange the device so as to throw the outer end of the binder back when turning and forward when starting straight away the forward end of the cross bar is disconnected from the grain side of the extension bar and transferred to the opposite end, as indicated at 20. The lower end of the cross bar may remain in the extreme end of the movement translating bar or can be moved upwardly in one of the holes farther toward the forward end of the cross bar, thus adjusting the swing of the machine. By removing the cross bar and leaving the movement translating bar rigid with the plate the rigid hitch is provided, or, if desired, the movement translating bar and cross bar may both be eliminated and the forward end of the grain bar itself bolted to the plate, the various bolts in both the forward end of the grain bar and the plate itself permitting any desired degree of adjustment.

In the event that the tractor has a long cross bar the extension bar can be dispensed with, although in ordinary conditions it is advisable to provide the extension bar as shown in the drawings.

It will thus be seen that with my construction any degree of adjustment may be obtained by simply shifting the relative position of the grain bar, cross bar and movement translating bar.

Other details of construction will appear that in no way depart from the spirit of my invention.

What I claim is:

1. In a device of the class described, a draft bar adapted to connect with a tractor bar, a movement translating bar, a plate adapted to support said movement translating bar mounted on said draft bar, and means for adjustably securing said movement translating bar to said tractor bar.

2. In a device of the class described, a draft bar adapted to connect with a tractor a movement translating bar, a plate mounted on said draft bar below said movement translating bar, means for securing said movement translating bar to said plate, and means for adjustably securing said movement translating bar to said tractor.

3. In a device of the class described, a draft bar adapted to connect with a forward bar, a movement translating bar on said draft bar, a plate supporting said movement translating bar, means whereby said bar may be adjustably mounted on said plate, and a cross bar connected to one end of said movement translating bar and adapted to be connected to either end of said forward bar.

4. In a device of the class described, a draft bar, one end of which is adapted to be secured to the forward end of an implement and the other end secured to the rear end of a tractor, a grain bar positioned on the grain side of said draft bar, and means for adjustably securing said grain bar to said draft bar, said means including a movement translating bar pivotally mounted on said draft bar and a plate containing means for holding said movement translating bar in any desired position.

5. In a tractor binder hitch, the combination of a rear bar, a draft bar, a grain bar pivoted at one end to the rear bar, a movement translating bar connected by a fixed pivot to the draft bar, the other end of said grain bar being pivotally connected to said movement translating bar at one side of said draft bar, a forward bar for attachment to a tractor to which said draft bar is secured by a fixed pivot and a cross bar connected to said movement translating bar at the opposite side of said draft bar and to one end of said forward bar.

6. In a tractor binder hitch, the combination of a rear bar, a draft bar, a grain bar pivotally connected at one end to the rear bar, a movement translating bar pivotally mounted on said draft bar, a plate mounted on said draft bar to which said movement translating bar may be rigidly secured, said grain bar being pivotally connected at its other end to the grain side of said movement translating bar, a forward extension bar to which said draft bar is pivotally secured, a cross bar connected to the stubble end of said movement translating bar and adapted to be connected to either side of said extension bar, and means for connecting said extension bar to a tractor bar.

7. In an offsetting and steering hitch, in combination, a forward bar for attachment to a draft vehicle, a trailer bar for attachment to a trailing vehicle, a draft reach connected by a fixed pivot to the forward bar intermediate the ends of the latter and connected to the trailer bar at a point spaced from the grain end thereof, and means for steering and offsetting the draft and trailing vehicles relatively comprising a movement translating member connected by a fixed pivot to the draft reach intermediate its ends and extending at either side thereof, a bar pivotally connected to the trailer bar and to the movement translating member at the same side of the reach, and a bar pivotally connected at one end to the movement translating member on the opposite side of said reach and at its other end to said forward bar.

8. A hitch device for connecting and variably offsetting two vehicles and effecting relative steering therebetween, comprising bars, one adapted to be connected with the rearward portion of the frame of one vehicle and the other with the forward portion of the frame of the other vehicle, a draft member connected at its opposite ends to said bars by fixed pivots, and connecting means between said bars pivotally connected thereto at its opposite ends on the same side of said draft member for causing said bars to turn in opposite directions, said connecting means being adjustable for variably spacing and fixing the distance between the connecting points of said means with said bars and for changing the angular positions of said bars with respect to each other and the draft member.

9. A hitch device for connecting and variably offsetting two vehicles and effecting relative steering therebetween, comprising bars, one adapted to be connected with the rearward portion of the frame of one vehicle and the other with the forward portion of the frame of the other vehicle, a draft member connected at its opposite ends to said bars by fixed pivots, and connecting means between said bars pivotally connected thereto at its opposite ends, said connecting means comprising a pair of links and an intermediate member extending across said draft member and being pivotally connected thereto at the crossing point and to said links at its opposite ends, said connecting means being adjustable for variably spacing and fixing the distance between the connecting points of said means with said bars and for changing the angular positions of said bars with respect to each other and the draft member.

10. A hitch device for connecting and variably offsetting two vehicles and effecting relative steering therebetween, comprising bars, one adapted to be connected with the rearward portion of the frame of one vehicle and the other with the forward portion of the frame of the other vehicle, a draft member connected at its rear end to the rear bar by a fixed pivot and at its forward end to the front bar intermediate the ends thereof by a fixed pivot, and connecting means between said bars pivotally connected at its rear end to the rear bar and adapted to be pivotally connected at its forward end to either end of the front bar, said connecting means being adjustable for variably spacing and fixing the distance between the connecting points of said means with said bars and for changing the angular positions of said bars with respect to each other and the draft member.

In testimony whereof I have affixed my signature.

JOSEPH W. GAMBLE.